Aug. 3, 1943.   C. S. FREDRICKSEN   2,326,023
ADJUSTABLE HANDLE
Filed March 16, 1942
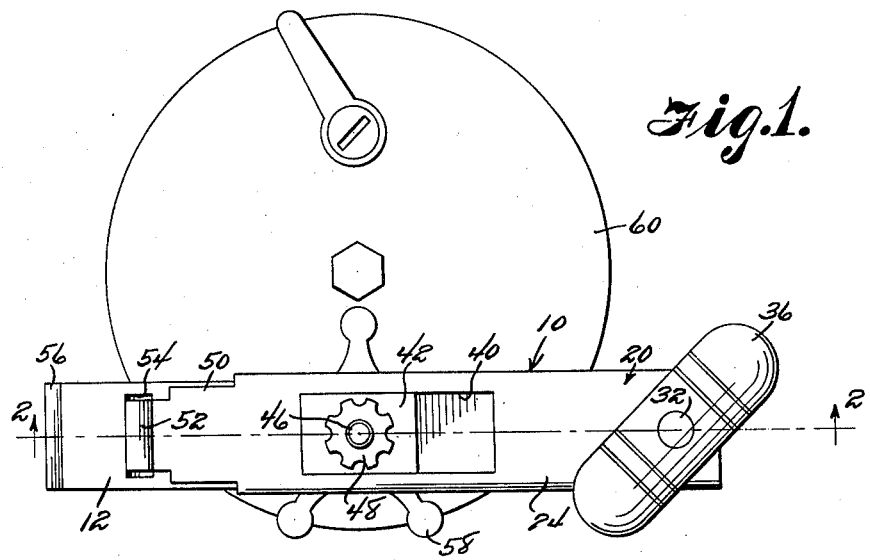
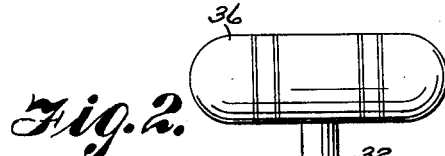
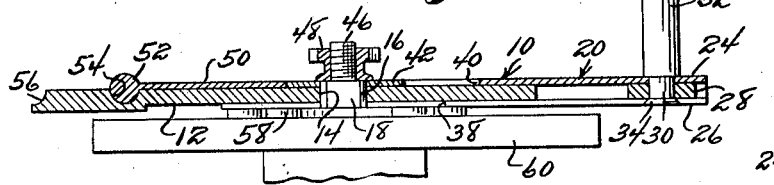
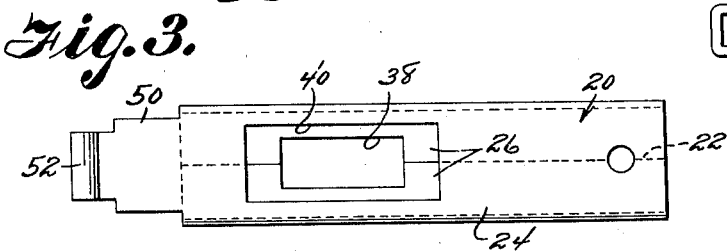
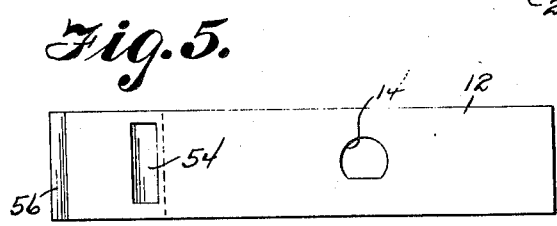
Cheney S. Fredricksen
INVENTOR.
BY
Victor J. Evans & Co.
ATTORNEYS Patented Aug. 3, 1943

2,326,023

UNITED STATES PATENT OFFICE 2,326,023

ADJUSTABLE HANDLE

Cheney S. Fredricksen, Jensen, Fla.

Application March 16, 1942, Serial No. 434,813

4 Claims. (Cl. 74—546)

My invention relates to fishing reels, and has among its objects and advantages the provision of an improved handle adjustable for length to attain a variable leverage.

In the accompanying drawing:

Figure 1 is a face view of a conventional reel illustrating my invention applied thereto.

Figure 2 is a sectional view along the line 2—2 of Figure 1.

Figure 3 is a face view of a portion of the handle structure.

Figure 4 is an end view of one of the handle parts.

Figure 5 is a face view of another handle part, and

Figure 6 is a perspective view of a stop plate.

In the embodiment of the invention selected for illustration, the handle 10 comprises a strap like member 12 having an opening 14 for the reception of the reel shaft 16. This shaft is flattened at 18 and the opening 14 is of the same contour so as to be restrained from relative rotation on the shaft.

Upon the member 12 is slidably mounted a tubular member 20 having the flattened contour of the member 12. The member 20 is bent from sheet metal and has its edges meeting along a line 22 and in a common plane. Between the walls 24 and 26 of the member 20 is interposed a spacer 28 in the nature of a washer mounted on a pin 30 at the end of a shaft 32. This pin extends through openings in the walls 24 and 26 and is riveted at 34 to fixedly connect the shaft 32 with the member 20. A grip 36 is fixed to the outer end of the shaft 32.

The meeting edges 22 lie in a plane corresponding to the axes of the shaft 16 and the pin 30, and the wall 26 is provided with an elongated opening 38 which has a width corresponding to the diameter of the shaft 16 so that the member 20 may be moved longitudinally of the member 12 and relatively to the shaft 16. A larger opening 40 is provided in the wall 24 to receive a stop plate 42 having an opening 44 fitting snugly on the shaft 16. This stop plate lies on the member 12 and is somewhat shorter than the length of the opening 40 to permit the necessary relative longitudinal movement of the member 20 with respect to the member 12. A threaded pin 46 is carried by the shaft 16 and is provided with a nut 48 which has end engagement with the stop plate 42 to hold the handle structure 10 in assembled relationship with the shaft 16.

The end of the member 20 remote from the shaft 32 includes a narrowed resilient strap 50 lying snug against the member 12 and provided with a cylindrical body 52 at its extreme end and lying at right angles to the longitudinal axis of the member 12. The member 12 is provided with recesses 54 and 56 for selective reception of the body 52 when the member 20 is moved to its handle extending and shortening positions, respectively. The opening 40 is of such length that the stop plate 42 is brought into engagement with the member 20 in either of its extreme positions to function as a positive stop, but with the recesses 54 and 56 so located as to permit the body 52 to drop therein for releasably latching the members 12 and 20. The member 20 may be moved to its handle extending position by turning the handle structure 10 in a progressively increasing radius, while the member may be moved toward its handle shortening position by winding the handle structure 10 in a progressively decreasing radius.

The member 20 lies against the star drag 58 of the reel 60. The handle structure 10 is effectively balanced and comprises a sturdy construction which is easily adjusted to lengthening and shortening positions to secure a variable reel leverage.

Without further elaboration, the foregoing will so fully explain my invention, that others may, by applying current knowledge, readily adapt the same for use under various conditions of service.

I claim:

1. In a fishing reel having a rotatable shaft, a first member in the nature of a strap keyed to said shaft, a second member of flattened tubular contour slidably receiving said first member and having first and second openings, said first opening being elongated longitudinally of the second member and having a width corresponding to that of the diameter of said shaft but with a length considerably longer to provide accommodation for relative movement of the second member, and a stop plate lying on said first member and inside said second opening, said second opening being elongated longitudinally of said second member and having a width conforming to that of the stop plate but a length greater than the stop plate so that the second member may be shifted to predetermined first and second handle lengthening and shortening positions, respectively, relatively to the first member.

2. The invention described in claim 1 wherein a grip is attached to one end of said second member, said first member being provided with spaced recesses, and a resilient extension on said second member having a body selectively receivable in said recesses in the extreme handle lengthening and shortening positions of the second member, respectively.

3. The invention described in claim 1 wherein said shaft is provided with a nut threadedly connected therewith and engaging said stop plate to hold the handle in connected relationship with the shaft.

4. In a fishing reel having a rotatable shaft, a first handle member keyed to said shaft, a second handle member slidably connected with said first handle member and having first and second openings, said first opening being elongated longitudinally of the second handle member and having a width corresponding to that of the diameter of said shaft but with a considerably greater length to provide accommodation for relative movement of the second handle member, and a stop means lying on said first member and within said second opening, said second opening being elongated longitudinally of said second handle member and having a width conforming to that of the stop means but a length greater than the latter so that the second handle member may be shifted to predetermined handle lengthening and shortening positions relatively to the first handle member.

CHENEY S. FREDRICKSEN.